(12) United States Patent
Oguni

(10) Patent No.: US 7,727,610 B2
(45) Date of Patent: Jun. 1, 2010

(54) COMPOSITIONS FOR PROTECTIVE FILMS FOR OPTICAL DISCS

(75) Inventor: Kiichiro Oguni, Tochigi (JP)

(73) Assignees: Sony Corporation, Tokyo (JP); Sony Chemical & Information Device Corporation, Tokyo (JP)

(*) Notice: Subject to any disclaimer, the term of this patent is extended or adjusted under 35 U.S.C. 154(b) by 0 days.

(21) Appl. No.: 11/550,248

(22) Filed: Oct. 17, 2006

(65) Prior Publication Data

US 2007/0059479 A1 Mar. 15, 2007

Related U.S. Application Data

(63) Continuation of application No. PCT/JP2005/008235, filed on Apr. 28, 2005.

(30) Foreign Application Priority Data

Apr. 30, 2004 (JP) ............... 2004-135583

(51) Int. Cl.
*B32B 3/02* (2006.01)
(52) U.S. Cl. .......... 428/65.1; 428/64.1; 428/64.6; 430/270.1; 430/273.1; 522/95; 522/96
(58) Field of Classification Search ........... 428/64.1, 428/65.1
See application file for complete search history.

(56) References Cited

U.S. PATENT DOCUMENTS

| 5,238,744 A | 8/1993 | Williams et al. |
| 5,609,990 A | 3/1997 | Ha et al. |
| 6,878,333 B1* | 4/2005 | Yokoyma et al. ............ 264/494 |
| 2001/0008691 A1* | 7/2001 | Isogai et al. ................ 428/412 |

FOREIGN PATENT DOCUMENTS

| JP | 04-227617 | 8/1992 |
| JP | 04-247338 | 9/1992 |
| JP | 05-135405 | 6/1993 |
| JP | 10-513594 | 12/1998 |
| JP | 2000-007741 | 1/2000 |
| WO | 96/24928 | 8/1996 |

OTHER PUBLICATIONS

European Search Report dated Aug. 6, 2007.

* cited by examiner

*Primary Examiner*—Cynthia H Kelly
*Assistant Examiner*—Anna L Verderame
(74) *Attorney, Agent, or Firm*—K&L Gates LLP

(57) ABSTRACT

Compositions for protective films for optical disc are provided. Compositions for protective films, particularly compositions for protective films for optical discs having low viscosity and low shrinkage without compromising scratch resistance even when a dilution solvent is not used. The compositions for protective films for optical discs include a composition for protective films containing a UV-curable acrylic radical-based resin as the main component including a multifunctional acrylic monomer, a multifunctional acrylic oligomer and a bifunctional acrylic monomer containing repeating units including at least one of an ethoxy and propoxy group as starting materials for the acrylic radical-based resin; and a photoinitiator.

15 Claims, 1 Drawing Sheet

COMPOSITIONS FOR PROTECTIVE FILMS FOR OPTICAL DISCS

CROSS-REFERENCE TO RELATED APPLICATIONS

This application claims priority benefit of Japanese Application No. 2004-135583, filed on Apr. 30, 2004, the entire disclosure of which is incorporated herein by reference.

This application is a continuation of International Application No. PCT/JP2005/008235, filed Apr. 28, 2005 the entire disclosure of which is incorporated herein by reference.

BACKGROUND

The present application relates to resin compositions for protective films, particularly resin compositions for protective films used as protective films for optical discs such as compact discs (CDs), digital versatile discs (DVDs), and the like.

Typically, optical discs of this type are provided with hard coatings on the surfaces of their exterior parts to protect the surfaces of the exterior parts against scratches.

Effective materials for such coatings are inorganic materials having high scratch resistance, but the inorganic materials have the disadvantage that coating solutions thereof are difficult to apply in a small thickness because of high viscosities.

For this reason, studies have been recently conducted to achieve coatings of small thickness by using low-viscosity UV-curable coating materials.

In order to ensure both scratch resistance and good coating geometry in such UV-curable coating materials, it is effective to use coating materials having low shrinkage and low viscosity, but low-shrinkage UV-curable hard coating materials have the disadvantage that solutions thereof has high-viscosity.

A conventional approach to solve this problem is to lower the viscosity of coating solutions by solvent dilution, but this approach increases the number of processes because the step of diffusing diluted solutions is required.

Another possible approach is to prepare a low-viscosity hard coating solution by using a diluent monomer, but this approach may decrease scratch resistance or increase cure shrinkage (warp).

Moreover, it is necessary to select materials allowing light transmission in a necessary wavelength range when hard coating materials of this type are to be used in light-transmitting parts of optical discs.

SUMMARY

The present application was made to solve such problems of the conventional techniques and aims to provide a composition for protective films, particularly a composition for protective films for optical discs having low viscosity and low shrinkage without compromising scratch resistance even when a dilution solvent is not used.

The present application is based on a finding that the viscosity and shrinkage of compositions for protective films can be lowered without compromising scratch resistance and desired light transmittance can be attained by curing acrylic monomers and acrylic oligomers having specific functional groups with specific photoinitiators.

Embodiments include compositions for protective films containing a UV-curable acrylic radical-based resin as the main component, including: a multifunctional acrylic monomer, a multifunctional acrylic oligomer and a bifunctional acrylic monomer containing repeating units at least one of an ethoxy and propoxy group as starting materials for the acrylic radical-based resin; and an appropriate photoinitiator.

Embodiments include compositions for protective films wherein the multifunctional acrylic monomer has a functionality of 4 or more and 6 or less.

Embodiments include compositions for protective films wherein the multifunctional acrylic oligomer has a functionality of 6 or more and 10 or less.

Embodiments include compositions for protective films wherein the bifunctional acrylic monomer contains 2-4 repeating units of an ethoxy group.

Embodiments include compositions for protective films wherein the bifunctional acrylic monomer contains 2-4 repeating units of a propoxy group.

Embodiments include compositions for protective films wherein the photoinitiator has a long wavelength absorption edge at less than 405 nm.

Embodiments include compositions for protective films wherein the multifunctional acrylic monomer is contained in an amount of 4 parts by weight or more and 10 parts by weight or less in 100 parts by weight of the starting materials for the acrylic radical-based resin.

Embodiments include compositions for protective films wherein the multifunctional acrylic oligomer is contained in an amount of 10 parts by weight or more and 36 parts by weight or less in 100 parts by weight of the starting materials for the acrylic radical-based resin.

Embodiments include compositions for protective films wherein the composition contains 4 parts by weight or more and 10 parts by weight or less of the multifunctional acrylic monomer, 10 parts by weight or more and 36 parts by weight or less of the multifunctional acrylic oligomer and 60 parts by weight or more and 80 parts by weight or less of the bifunctional acrylic monomer in 100 parts by weight of the starting materials for the acrylic radical-based resin, and 5 parts by weight or more and 10 parts by weight or less of the photoinitiator.

Embodiments include compositions for protective films wherein the composition for protective films has a viscosity of 20 mPa·s or more and less than 50 mPa·s in the invention disclosed above.

Embodiments also include a composition for protective films for optical discs comprising the composition for protective films such as disclosed above.

Embodiments also include a protective film for optical discs obtained by curing the composition for protective films for optical discs such as disclosed above.

Embodiments also include an optical disc having the protective film for optical discs such as disclosed above on the surface of the readout side of the substrate.

According to an embodiment, the viscosity and shrinkage of the composition for protective films can be lowered without compromising scratch resistance and warp resistance can also be improved because flexible cured products with high surface hardness can be obtained by using starting materials for a acrylic radical-based resin comprising a multifunctional acrylic monomer, a multifunctional acrylic oligomer and a bifunctional acrylic monomer containing repeating units at least one of an ethoxy and propoxy group.

According to an embodiment, compositions for protective films for optical discs having high scratch resistance and warp resistance as well as good coating geometry and high light transmittance can be provided.

Additional features and advantages are described herein, and will be apparent from, the following Detailed Description and the figures.

DETAILED DESCRIPTION

Figure 1:
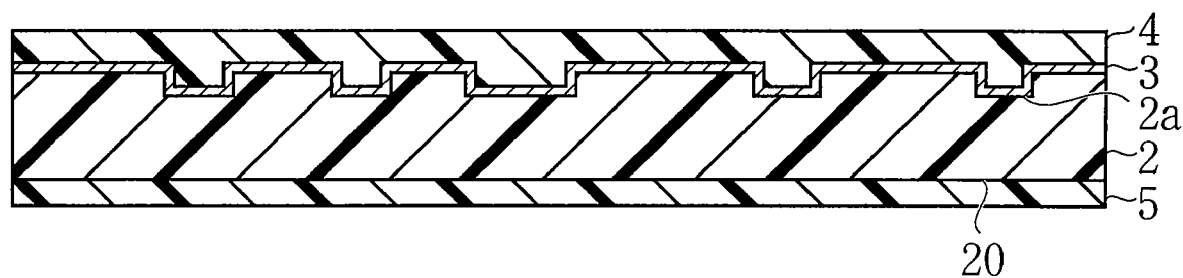
FIG. 1 is a schematic diagram showing an example of an optical disc to which a composition for protective films for optical discs of the present application has been applied.

The most preferred embodiments of compositions for protective films according to the present application are explained in detail below.

The compositions for protective films (for optical discs) of the present application are based on a UV-curable acrylic radical-based resin, and include a multifunctional acrylic monomer, a multifunctional acrylic oligomer and a bifunctional acrylic monomer containing repeating units including at least one of an ethoxy and propoxy group as starting materials for the acrylic radical-based resin, and an appropriate photoinitiator.

The multifunctional acrylic monomer is utilized to improve scratch resistance and preferably has an acrylic functionality of 4 or more and 6 or less to ensure necessary scratch resistance.

Such multifunctional acrylic monomers include ethoxylated pentaerythritol tetraacrylate, pentaerythritol tetraacrylate, ditrimethylolpropane tetraacrylate (DTMPTA), and the like.

Among these, ethoxylated pentaerythritol tetraacrylate is preferably used to improve scratch resistance.

In an embodiment, the multifunctional acrylic monomer is preferably contained in an amount of, but not specifically limited to, 4 parts by weight or more and 10 parts by weight or less in 100 parts by weight of the starting materials for the acrylic radical-based resin.

If the multifunctional acrylic monomer is contained in an amount of less than 4 parts by weight per 100 parts by weight of the starting materials for the acrylic radical-based resin, scratch resistance cannot be sufficiently ensured, and if it is greater than 10 parts by weight, warp resistance disadvantageously decreases.

The multifunctional acrylic oligomer is contained to improve scratch resistance and preferably has an acrylic functionality of 6 or more and 10 or less to ensure necessary scratch resistance.

Such multifunctional acrylic oligomers include, for example, aromatic urethane acrylate oligomers, aliphatic urethane acrylate oligomers, and the like.

In an embodiment, the multifunctional acrylic oligomer is preferably contained in an amount of, but not specifically limited to, 10 parts by weight or more and 36 parts by weight or less in 100 parts by weight of the starting materials for the acrylic radical-based resin.

If the multifunctional acrylic oligomer is contained in an amount of less than 10 parts by weight per 100 parts by weight of the starting materials for the acrylic radical-based resin, scratch resistance cannot be sufficiently ensured, and if it is greater than 36 parts by weight, viscosity disadvantageously becomes excessively high.

The bifunctional acrylic monomer containing repeating units including at least one of an ethoxy and a propoxy group is contained to achieve low viscosity and low shrinkage without using a solvent while retaining scratch resistance.

From this viewpoint, a monomer containing 2-4 repeating units of an ethoxy group is preferably used.

From a similar viewpoint, a monomer containing 2-4 repeating units of a propoxy group is preferably used.

Such bifunctional acrylic monomers include, for example, dipropylene glycol diacrylate, tripropylene glycol diacrylate, tetrapropylene glycol diacrylate, diethylene glycol diacrylate, triethylene glycol diacrylate, tetraethylene glycol diacrylate, hexanediol diacrylate, and the like.

In an embodiment, the type of the photoinitiator is not specifically limited, but it is preferable to use a photoinitiator having a long wavelength absorption edge (e.g., the absorption edge of the absorption spectrum of a 0.1% photoinitiator—acetonitrile solution) at a wavelength shorter than the wavelength of the laser light used for optical discs in order to ensure light transmission when it is used for protective films for optical discs.

For example, photoinitiators having a long wavelength absorption edge at less than 780 nm, less than 650 nm and less than 405 nm can be suitably used for CDs, DVDs and next-generation optical discs, respectively.

Especially, photoinitiators that can be suitably used for next-generation optical discs include 1-hydroxy-cyclohexyl-phenyl-ketone, 2-methyl-1-[4-(methylthio)phenyl]-2-morpholinopropane-1-one, 2-hydroxy-2-methyl-1-phenyl-propane-1-one, and the like.

Among these, 1-hydroxy-cyclohexyl-phenyl-ketone is preferred because it efficiently transmits laser light at a wavelength of 405 nm.

In an embodiment, the photoinitiator is preferably contained in an amount of, but not specifically limited to, 5 parts by weight or more and 10 parts by weight or less to ensure scratch resistance.

In an embodiment, the viscosity of the compositions for protective films is not specifically limited, but preferably 20 mPa·s or more and less than 50 mPa·s to improve the coating geometry of coating solutions on substrate surfaces.

The compositions for protective films for optical discs of the present invention may further contain other components such as UV absorbents, surface tension modifiers, and the like.

FIG. 1 is a schematic diagram showing an example of an optical disc to which a composition for protective films for optical discs of the present application has been applied.

As shown in FIG. 1, an optical disc 1 of the present application has a conventional structure, including a recording pattern 2a, a reflective film 3 and a protective film 4 formed on a disc-shaped substrate 2 made from a polycarbonate.

In an embodiment, a protective film 5 for optical disc, obtained by curing a composition for protective films for optical discs as described above, is further provided on the readout side 20 of the substrate 2.

In an embodiment, the thickness of the protective film 5 for optical disc is not specifically limited, but is preferably 3-6 μm to ensure scratch resistance and light transmission.

Embodiments can be employed as compositions, not only for protective films for optical discs, but also for various protective films. However, they are most effectively when employed as compositions for protective films for optical components such as optical discs as described above.

EXAMPLES

Examples of the present invention are explained in detail below along with Comparative Examples.

Example 1

To a mixed solution of 4.5 parts by weight of a multifunctional acrylic monomer consisting of ethoxylated pentaerythritol tetraacrylate (sold under the name "EB40" from Daicel UCB Co., Ltd.), 13.5 parts by weight of a multifunctional acrylic oligomer composed of a hexafunctional aromatic urethane acrylate oligomer (sold under the name "CN975" from Kayaku Sartomer Co., Ltd.) and 72 parts by weight of a bifunctional acrylic monomer composed of triethylene glycol diacrylate (sold under the name "SR272" from Kayaku Sartomer Co., Ltd.) was added 10 parts by weight of a photoinitiator consisting of 1-hydroxy-cyclohexyl-phenyl-ketone (sold under the name "Irgacure 184" from Ciba Specialty Chemicals K.K.) as shown in Table 1 to prepare a coating solution.

Example 1a

A coating solution was prepared in the same manner as in Example 1 except that the amount of the multifunctional acrylic monomer was changed to 10 parts by weight.

Example 1b

A coating solution was prepared in the same manner as in Example 1 except that the amount of the multifunctional acrylic oligomer was changed to 30 parts by weight.

Example 1c

A coating solution was prepared in the same manner as in Example 1 except that the amount of the bifunctional acrylic monomer was changed to 60 parts by weight.

Example 1d

A coating solution was prepared in the same manner as in Example 1 except that the amount of the photoinitiator was changed to 5 parts by weight.

Comparative Example 1a

A coating solution was prepared in the same manner as in Example 1 except that the amount of the multifunctional acrylic monomer was changed to 15 parts by weight.

Comparative Example 1b

A coating solution was prepared in the same manner as in Example 1 except that the amount of the multifunctional acrylic oligomer was changed to 40 parts by weight.

Comparative Example 1c

A coating solution was prepared in the same manner as in Example 1 except that the amount of the bifunctional acrylic monomer was changed to 85 parts by weight.

Comparative Example 1d

A coating solution was prepared in the same manner as in Example 1 except that the amount of the photoinitiator was changed to 3 parts by weight.

Example 2

A coating solution was prepared in the same manner as in Example 1 except that 13.5 parts by weight of a hexafunctional aliphatic urethane acrylate oligomer (sold under the name "CN968" from Kayaku Sartomer Co., Ltd.) was added as a multifunctional acrylic oligomer.

Example 3

A coating solution was prepared in the same manner as in Example 1 except that 13.5 parts by weight of another hexafunctional aromatic urethane acrylate oligomer (sold under the name "CN999" from Kayaku Sartomer Co., Ltd.) was added as a multifunctional acrylic oligomer.

Comparative Example 2

A coating solution was prepared in the same manner as in Example 1 except that 13.5 parts by weight of a bifunctional aromatic urethane acrylate oligomer (sold under the name "CN973" from Kayaku Sartomer Co., Ltd.) was added as a multifunctional acrylic oligomer.

Comparative Example 3

A coating solution was prepared in the same manner as in Example 1 except that 13.5 parts by weight of a Bis-A epoxy acrylate oligomer (sold under the name "EB3700" from Daicel UCB Co., Ltd.) was added as a multifunctional acrylic oligomer.

Example 4

A coating solution was prepared in the same manner as in Example 1 except that 4.5 parts by weight of ditrimethylolpropane tetraacrylate (sold under the name "M-408" from Toagosei Co., Ltd.) was added as a multifunctional acrylic monomer.

Example 5

A coating solution was prepared in the same manner as in Example 1 except that 4.5 parts by weight of pentaerythritol tetraacrylate (sold under the name "M-450" from Toagosei Co., Ltd.) was added as a multifunctional acrylic monomer.

Example 6

A coating solution was prepared in the same manner as in Example 1 except that 72 parts by weight of dipropylene glycol diacrylate (sold under the name "Laromer DPGDA" from BASF Corporation) was added as a bifunctional acrylic monomer.

Example 7

A coating solution was prepared in the same manner as in Example 1 except that 72 parts by weight of tripropylene glycol diacrylate (sold under the name "Laromer TPGDA" from BASF Corporation) was added as a bifunctional acrylic monomer.

Example 8

A coating solution was prepared in the same manner as in Example 1 except that 72 parts by weight of tetrapropylene glycol diacrylate (sold under the name "Blemmer ADP-200" from NOF Corporation) was added as a bifunctional acrylic monomer.

Comparative Example 4

A coating solution was prepared in the same manner as in Example 1 except that 72 parts by weight of heptapropylene glycol diacrylate (sold under the name "Blemmer ADP-400" from NOF Corporation) was added as a bifunctional acrylic monomer.

Example 9

A coating solution was prepared in the same manner as in Example 1 except that 72 parts by weight of diethylene glycol diacrylate (sold under the name "SR230" from Kayaku Sartomer Co., Ltd.) was added as a bifunctional acrylic monomer.

Example 10

A coating solution was prepared in the same manner as in Example 1 except that 72 parts by weight of tetraethylene glycol diacrylate (sold under the name "Blemmer ADE-200" from NOF Corporation) was added as a bifunctional acrylic monomer.

Comparative Example 5

A coating solution was prepared in the same manner as in Example 1 except that 72 parts by weight of trimethylolpropane triacrylate (sold under the name "Alonix M-350" from Toagosei Co., Ltd.) was added as a bifunctional acrylic monomer.

Comparative Example 6

A coating solution was prepared in the same manner as in Example 1 except that 72 parts by weight of neopentyl glycol diacrylate (sold under the name "Light Acrylate NP-A" from Kyoeisha Chemical Co., Ltd.) was added as a bifunctional acrylic monomer.

Example 11

A coating solution was prepared in the same manner as in Example 1 except that 72 parts by weight of hexanediol diacrylate (sold under the name "Laromer HDDA" from BASF Corporation) was added as a bifunctional acrylic monomer.

Example 12

A coating solution was prepared in the same manner as in Example 1 except that 10 parts by weight of 2-methyl-1-[4-(methylthio)phenyl]-2-morpholinopropane-1-one (sold under the name "Irgacure 907" from Ciba Specialty Chemicals) was added as a photoinitiator.

Example 13

A coating solution was prepared in the same manner as in Example 1 except that 10 parts by weight of 2-hydroxy-2-methyl-1-phenyl-propane-1-one (sold under the name "Darocure 1173" from Ciba Specialty Chemicals K.K.) was added as a photoinitiator.

Comparative Example 7

A coating solution was prepared in the same manner as in Example 1 except that 10 parts by weight of 2-benzyl-2-dimethylamino-1-(4-morpholinophenyl)-butanone-1 (sold under the name "Irgacure 369" from Ciba Specialty Chemicals K.K.) was added as a photoinitiator.

[Evaluation]

Evaluation items and results of the Examples and Comparative Examples are explained in detail below.

[Viscosity]

The average viscosity of each of the coating solutions of the Examples and Comparative Examples prepared by the methods described above was determined by a cone and plate viscometer. The results are shown in Tables 2 and 3.

Here, coating solutions having a viscosity of less than 50 mPa·s were evaluated as "○" and those having a viscosity of 50 mPa·s or more were evaluated as "x".

[Scratch Resistance]

Each of the coating solutions of the Examples and Comparative Examples was applied on a low molecular weight polycarbonate substrate formed by injection molding into a thickness of 3 µm after drying.

This coating film was irradiated with UV rays at an integrated dose of 1000 mJ/cm using a high-pressure mercury lamp (120 W/cm).

Thus cured film was evaluated for scratch resistance. The results are shown in Tables 2 and 3.

Here, a Taber Abrasion Tester (CS-10F abrading wheels, load 250 g, 100 revolutions) was used to evaluate samples having a Δ haze value of less than 10% after testing as "○" and samples having a Δ haze value of 10% or more after testing as "x".

[Warp Resistance]

Each of the coating solutions of the Examples and Comparative Examples was applied on the low molecular weight polycarbonate substrate described above into a thickness of 3 μm after drying.

The warp angle was determined by measuring the variation in tilt (radial skew) of each substrate using an in-house warp angle meter provided with a laser displacement sensor to evaluate warp resistance.

Here, samples were evaluated as "○" or "×" according to whether the absolute value of the variation in tilt induced by the application of the coating solution is less than 0.1 degree or 0.1 degree or more. The results are shown in Tables 2 and 3.

[Light Transmittance]

Each of the coating solutions of the Examples and Comparative Examples was applied on a transparent substrate of quartz glass, and this coating film was irradiated with the UV rays as described above to give a cured film having a thickness of 3 μm.

The light transmittance of the cured film was evaluated by a UV/visible spectrophotometer. The results are shown in Tables 2 and 3.

TABLE 1

Material used in the compositions of the Examples and Comparative Examples

| | Proprietary name (manufacturer) | Chemical name |
|---|---|---|
| Multifuctional acrylic monomer | EB40 (Daicel UCB Co., Ltd.) | Ethoxylated pentaerythritol tetraacrylate |
| | M-408 (Toagosei Co., Ltd.) | Ditrimethylolpropane tetraacrylate |
| | M-450 (Toagosei Co., Ltd.) | Pentaerythritol tetraacrylate |
| Multifuctional acrylic oligomer | CN975 (Kayaku Sartomer Co., Ltd.) | Aromatic urethane acrylate oligomer, hexafunctional |
| | CN968 (Kayaku Sartomer Co., Ltd.) | Aliphatic urethane acrylate oligomer, hexafunctional |
| | CN999 (Kayaku Sartomer Co., Ltd.) | Aromatic urethane acrylate oligomer, hexafunctional |
| | CN973 (Kayaku Sartomer Co., Ltd.) | Aromatic urethane acrylate oligomer, bifunctional |
| | EB3700 (Daicel UCB Co., Ltd.) | Epoxy acrylate oligomer, bifunctional |
| Bifunctional acrylic monomer | Laromer DPGDA (BASF Corporation) | Dipropylene glycol diacrylate |
| | Laromer TPGDA (BASF Corporation) | Tripropylene glycol diacrylate |
| | Blemmer ADP-200 (NOF Corporation) | Tetrapropylene glycol diacrylate |
| | Blemmer ADP-400 (NOF Corporation) | Heptapropylene glycol diacrylate |
| | SR230 (Kayaku Sartomer Co., Ltd.) | Diethylene glycol diacrylate |
| | SR272 (Kayaku Sartomer Co., Ltd.) | Triethylene glycol diacrylate |
| | Blemmer ADE-200 (NOF Corporation) | Tetraethylene glycol diacrylate |
| | Alonix M-350 (Toagosei Co., Ltd.) | Trimethylolpropane triacrylate |
| | Light Acrylate NP-A (Kyoeisha Chemical Co., Ltd.) | Neopentyl glrcol diacrylate |
| | Laromer HDDA (BASF Corporation) | Hexanediol diacrylate |
| Photoinitiator | Irgacure 184 (Ciba Specialty Chemicals K.K.) | 1-Hydroxy-cyclohexyl-phenyl-ketone |
| | Irgacure 907 (Ciba Specialty Chemical K.K.) | 2-Methyl-1-[4-(methylthio)phenyl]-2-morpholinopropane-1-one |
| | Darocure 1173 (Ciba Specialty Chemicals K.K.) | 2-Hydroxy-2-methyl-1-phenyl-propane-1-one |
| | Irgacure 369 (Ciba Specialty Chemicals K.K.) | 2-Benzyl-2-dimethylamino-1-(4-morpholinophenyl)-butanone-1 |

TABLE 2

Evaluation results of the Examples and Comparative Examples

| | Proprietary name | Ex. 1 | Ex. 2 | Ex. 3 | C. E. 2 | C. E. 3 | Ex. 4 | Ex. 5 | Ex. 6 | Ex. 7 | Ex. 8 | C. E. 4 |
|---|---|---|---|---|---|---|---|---|---|---|---|---|
| Multifuctional acrylic monomer | EB 40 | 4.5 | 4.5 | 4.5 | 4.5 | 4.5 | — | — | 4.5 | 4.5 | 4.5 | 4.5 |
| | M-408 | — | — | — | — | — | 4.5 | — | — | — | — | — |
| | M-450 | — | — | — | — | — | — | 4.5 | — | — | — | — |
| Multifuctional acrylic oligomer | CN975 | 13.5 | — | — | — | — | 13.5 | 13.5 | 13.5 | 13.5 | 13.5 | 13.5 |
| | CN968 | — | 13.5 | — | — | — | — | — | — | — | — | — |
| | CN999 | — | — | 13.5 | — | — | — | — | — | — | — | — |
| | CN973 | — | — | — | 13.5 | — | — | — | — | — | — | — |
| | EB3700 | — | — | — | — | 13.5 | — | — | — | — | — | — |
| Bifunctional acrylic monomer | Laromer DPGDA | — | — | — | — | — | — | — | 72 | — | — | — |
| | Laromer TPGDA | — | — | — | — | — | — | — | — | 72 | — | — |
| | Blemmer ADP-200 | — | — | — | — | — | — | — | — | — | 72 | — |
| | Blemmer ADP-400 | — | — | — | — | — | — | — | — | — | — | 72 |
| | SR230 | — | — | — | — | — | — | — | — | — | — | — |
| | SR272 | 72 | 72 | 72 | 72 | 72 | 72 | 72 | — | — | — | — |
| | Blemmer ADE-200 | — | — | — | — | — | — | — | — | — | — | — |
| | Alonix M-350 | — | — | — | — | — | — | — | — | — | — | — |
| | Light Acrylate NP-A | — | — | — | — | — | — | — | — | — | — | — |
| | Laromer HDDA | — | — | — | — | — | — | — | — | — | — | — |
| Photoinitiator | Irgacure 184 | 10 | 10 | 10 | 10 | 10 | 10 | 10 | 10 | 10 | 10 | 10 |
| | Irgacure 907 | — | — | — | — | — | — | — | — | — | — | — |
| | Darocure 1173 | — | — | — | — | — | — | — | — | — | — | — |
| | Irgacure 369 | — | — | — | — | — | — | — | — | — | — | — |

TABLE 2-continued

Evaluation results of the Examples and Comparative Examples

| Evaluation results | Scratch resistance | ○ | ○ | ○ | X | X | ○ | ○ | ○ | ○ | ○ | X |
|---|---|---|---|---|---|---|---|---|---|---|---|---|
| | Warp resistance | ○ | ○ | ○ | ○ | ○ | ○ | ○ | ○ | ○ | ○ | ○ |
| | Viscosity | ○ | ○ | ○ | ○ | ○ | ○ | ○ | ○ | ○ | ○ | ○ |
| | Light trasmittance | ○ | ○ | ○ | ○ | ○ | ○ | ○ | ○ | ○ | ○ | ○ |

| | | Proprietary name | Ex. 9 | Ex. 10 | C. E. 5 | C. E. 6 | Ex. 11 | Ex. 12 | Ex. 13 | C. E. 7 |
|---|---|---|---|---|---|---|---|---|---|---|
| Multifuctional acrylic monomer | | EB 40 | 4.5 | 4.5 | 4.5 | 4.5 | 4.5 | 4.5 | 4.5 | 4.5 |
| | | M-408 | — | — | — | — | — | — | — | — |
| | | M-450 | — | — | — | — | — | — | — | — |
| Multifuctional acrylic oligomer | | CN975 | 13.5 | 13.5 | 13.5 | 13.5 | 13.5 | 13.5 | 13.5 | 13.5 |
| | | CN968 | — | — | — | — | — | — | — | — |
| | | CN999 | — | — | — | — | — | — | — | — |
| | | CN973 | — | — | — | — | — | — | — | — |
| | | EB3700 | — | — | — | — | — | — | — | — |
| Bifunctional acrylic monomer | | Laromer DPGDA | — | — | — | — | — | — | — | — |
| | | Laromer TPGDA | — | — | — | — | — | — | — | — |
| | | Blemmer ADP-200 | — | — | — | — | — | — | — | — |
| | | Blemmer ADP-400 | — | — | — | — | — | — | — | — |
| | | SR230 | 72 | — | — | — | — | — | — | — |
| | | SR272 | — | — | — | — | — | 72 | 72 | 72 |
| | | Blemmer ADE-200 | — | 72 | — | — | — | — | — | — |
| | | Alonix M-350 | — | — | 72 | — | — | — | — | — |
| | | Light Acrylate NP-A | — | — | — | 72 | — | — | — | — |
| | | Laromer HDDA | — | — | — | — | 72 | — | — | — |
| Photoinitiator | | Irgacure 184 | 10 | 10 | 10 | 10 | 10 | — | — | — |
| | | Irgacure 907 | — | — | — | — | — | 10 | — | — |
| | | Darocure 1173 | — | — | — | — | — | — | 10 | — |
| | | Irgacure 369 | — | — | — | — | — | — | — | 10 |
| Evaluation results | | Scratch resistance | ○ | ○ | ○ | X | ○ | ○ | ○ | ○ |
| | | Warp resistance | ○ | ○ | ○ | X | ○ | ○ | ○ | ○ |
| | | Viscosity | ○ | ○ | X | ○ | ○ | ○ | ○ | ○ |
| | | Light trasmittance | ○ | ○ | ○ | ○ | ○ | ○ | ○ | X |

(Note)
The figures in the table are expressed in parts by weight.

TABLE 3

Evaluation results of the Examples and Comparative Examples

| | Proprietary name | EX. 1a | Ex. 1b | Ex. 1c | Ex. 1d | C. E. 1a | C. E. 1b | C. E. 1c | C. E. 1d |
|---|---|---|---|---|---|---|---|---|---|
| Multifuctional acrylic monomer | EB 40 | 10 | 4.5 | 4.5 | 4.5 | 15 | 4.5 | 4.5 | 4.5 |
| | M-408 | — | — | — | — | — | — | — | — |
| | M-450 | — | — | — | — | — | — | — | — |
| Multifuctional acrylic oligomer | CN975 | 13.5 | 30 | 13.5 | 13.5 | 13.5 | 40 | 13.5 | 13.5 |
| | CN968 | — | — | — | — | — | — | — | — |
| | CN999 | — | — | — | — | — | — | — | — |
| | CN973 | — | — | — | — | — | — | — | — |
| | EB3700 | — | — | — | — | — | — | — | — |
| Bifunctional acrylic monomer | Laromer DPGDA | — | — | — | — | — | — | — | — |
| | Laromer TPGDA | — | — | — | — | — | — | — | — |
| | Blemmer ADP-200 | — | — | — | — | — | — | — | — |
| | Blemmer ADP-400 | — | — | — | — | — | — | — | — |
| | SR230 | — | — | — | — | — | — | — | — |
| | SR272 | 72 | 72 | 60 | 72 | 72 | 72 | 85 | 72 |
| | Blemmer ADE-200 | — | — | — | — | — | — | — | — |
| | Alonix M-350 | — | — | — | — | — | — | — | — |
| | Light Acrylate NP-A | — | — | — | — | — | — | — | — |
| | Laromer HDDA | — | — | — | — | — | — | — | — |
| Photoinitiator | Irgacure 184 | 10 | 10 | 10 | 5 | 10 | 10 | 10 | 3 |
| | Irgacure 907 | — | — | — | — | — | — | — | — |
| | Darocure 1173 | — | — | — | — | — | — | — | — |
| | Irgacure 369 | — | — | — | — | — | — | — | — |
| Evaluation results | Scratch resistance | ○ | ○ | ○ | ○ | ○ | ○ | X | X |
| | Warp resistance | ○ | ○ | ○ | ○ | X | ○ | ○ | ○ |
| | Viscosity | ○ | ○ | ○ | ○ | ○ | X | ○ | ○ |
| | Light transmittance | ○ | ○ | ○ | ○ | ○ | ○ | ○ | ○ |

(Note)
The figures in the table are expressed in parts by weight.

As shown in Tables 2 and 3, the viscosities of the coating solutions of Examples 1 to 13 were sufficiently low, i.e. less than 50 mPa·s.

The films after curing were good in both scratch resistance and warp resistance and had a light transmittance of 90% or more, showing that they are well suited as protective films for optical discs.

However, the film of Comparative Example 1a containing 15 parts by weight of the multifunctional acrylic monomer was poor in warp resistance.

Comparative Example 1b containing 40 parts by weight of the multifunctional acrylic oligomer was defective in coating geometry because the viscosity of the coating solution exceeded 50 mPa·s.

Both of Comparative Example 1c containing 85 parts by weight of the bifunctional acrylic monomer and Comparative Example 1d containing 3 parts by weight of the photoinitiator were poor in scratch resistance.

The films of Comparative Examples 2 and 3 using bifunctional acrylic oligomers as multifunctional acrylic oligomers were poor in scratch resistance.

The film of Comparative Example 4 using a monomer containing seven repeating units of a propoxy group as a bifunctional acrylic monomer was poor in scratch resistance.

Comparative Example 5 using trimethylolpropane triacrylate as a bifunctional acrylic monomer was defective in coating geometry because the viscosity of the coating solution exceeded 50 mPa·s.

The film of Comparative Example 6 using neopentyl glycol diacrylate as a bifunctional acrylic monomer was poor in scratch resistance and warp resistance.

The film of Comparative Example 7 using 2-benzyl-2-dimethylamino-1-(4-morpholinophenyl)-butanone-1 as a photoinitiator was found to be unsuitable as a protective film for optical discs because the light transmittance was less than 90%.

The resin compositions for protective films of the present application can be used for protective films for optical discs such as compact discs (CDs), digital versatile discs (DVDs), next generation optical discs, and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A composition for protective films containing a UV-curable acrylic radical-based resin as a main component, comprising:
   a multifunctional acrylic monomer, a multifunctional aromatic acrylic oligomer and a bifunctional acrylic monomer containing repeating units including at least one of an ethoxy and a propoxy group as starting materials for the acrylic radical-based resin; and
   a photoinitiator,
   4 parts by weight or more and 10 parts by weight or less of the multifunctional acrylic monomer, 10 parts by weight or more and 36 parts by weight or less of the multifunctional aromatic acrylic oligomer and 60 parts by weight or more and 80 parts by weight or less of the bifunctional acrylic monomer in 100 parts by weight of the starting materials for the acrylic radical-based resin and further comprising 5 parts by weight or more and 10 parts by weight or less of the photoinitiator wherein the composition has a viscosity of 20 mPa·s or more and less than 50 mPa·s.

2. The composition for protective films of claim 1 wherein the multifunctional acrylic monomer has a functionality of 4 or more and 6 or less.

3. The composition for protective films of claim 1 wherein the multifunctional aromatic acrylic oligomer has a functionality of 6 or more and 10 or less.

4. The composition for protective films of claim 1 wherein the bifunctional acrylic monomer contains 2 to 4 repeating units of an ethoxy group.

5. The composition for protective films of claim 1 wherein the bifunctional acrylic monomer contains 2 to 4 repeating units of a propoxy group.

6. The composition for protective films of claim 1 wherein the photoinitiator has a long wavelength absorption edge at less than 405 nm.

7. The composition for protective films of claim 2 wherein the multifunctional acrylic monomer is contained in an amount of 4 parts by weight or more and 10 parts by weight or less in 100 parts by weight of the starting materials for the acrylic radical-based resin.

8. The composition for protective films of claim 3 wherein the multifunctional aromatic acrylic oligomer is contained in an amount of 10 parts by weight or more and 36 parts by weight or less in 100 parts by weight of the starting materials for the acrylic radical-based resin.

9. A composition for protective films for optical discs, the composition comprising: a resin based composition containing a UV-curable acrylic radical- based resin as a main component including a multifunctional acrylic monomer, a multifunctional aromatic acrylic oligomer and a bifunctional acrylic monomer containing repeating units including at least one of an ethoxy and propoxy group as starting materials for the acrylic radical-based resin; and a photoinitiator,
   4 parts by weight or more and 10 parts by weight or less of the multifunctional acrylic monomer, 10 parts by weight or more and 36 parts by weight or less of the multifunctional aromatic acrylic oligomer and 60 parts by weight or more and 80 parts by weight or less of the bifunctional acrylic monomer in 100 parts by weight of the starting materials for the acrylic radical-based resin and further comprising 5 parts by weight or more and 10 parts by weight or less of the photoinitiator wherein the composition has a viscosity of 20 mPa·s or more and less than 50 mPa·s.

10. A protective, film for optical discs obtained by curing a composition for protective films for optical discs comprising a resin based composition for protective films containing a UV-curable acrylic radical-based resin as a main component including a multifunctional acrylic monomer, a multifunctional aromatic acrylic oligomer and a bifunctional acrylic monomer containing repeating units including at least one of an ethoxy and a propoxy group as starting materials for the acrylic radical-based resin; and an appropriate photoinitiator,
   4 parts by weight or more and 10 parts by weight or less of the multifunctional acrylic monomer, 10 parts by weight or more and 36 parts by weight or less of the multifunctional aromatic acrylic oligomer and 60 parts by weight or more and 80 parts by weight or less of the bifunctional acrylic monomer in 100 parts by weight of the starting materials for the acrylic radical-based resin and further comprising 5 parts by weight or more and 10 parts by weight or less of the photoinitiator wherein the composition has a viscosity of 20 mPa·s or more and less than 50 mPa·s.

11. An optical disc having a protective film for the optical disc provided on a surface of a readout side of a substrate, wherein the protective film is obtained by curing a composition for protective films for optical discs comprising a resin based composition for protective films containing a UV-curable acrylic radical-based resin as a main component including a multifunctional acrylic monomer, a multifunctional aromatic acrylic oligomer and a bifunctional acrylic monomer containing repeating units including at least one of an ethoxy and a propoxy group as starting materials for the acrylic radical-based resin; and a photoinitiator, 4 parts by weight or more and 10 parts by weight or less of the multifunctional acrylic monomer, 10 parts by weight or more and 36 parts by weight or less of the multifunctional aromatic acrylic oligomer and 60 parts by weight or more and 80 parts by weight or less of the bifunctional acrylic monomer in 100 parts by weight of the starting materials for the acrylic radical-based resin and further comprising 5 parts by weight or more and 10 parts by weight or less of the photoinitiator wherein the composition has a viscosity of 20 mPa·s or more and less than 50 mPa·s.

12. The composition for protective films according to claim 1, wherein the multifunctional aromatic acrylic oligomer is aromatic urethane acrylate oligomer.

13. The composition for protective films for optical discs according to claim 9, wherein the multifunctional aromatic acrylic oligomer is aromatic urethane acrylate oligomer.

14. The protective film for optical discs according to claim 12, wherein the multifunctional aromatic acrylic oligomer is aromatic urethane acrylate oligomer.

15. The optical disc according to claim 11, wherein the multifunctional aromatic acrylic oligomer is aromatic urethane acrylate oligomer.

* * * * *